(12) United States Patent
Jiang et al.

(10) Patent No.: US 10,063,481 B1
(45) Date of Patent: Aug. 28, 2018

(54) NETWORK ENDPOINT CONGESTION MANAGEMENT

(71) Applicant: Energy, United States Department of, Washington, DC (US)

(72) Inventors: Nan Jiang, St. Louis, MO (US); Larry Robert Dennison, Mendon, MA (US); William James Dally, Los Altos Hills, CA (US)

(73) Assignee: U.S. Department of Energy, Washington, DC (US)

( * ) Notice: Subject to any disclaimer, the term of this patent is extended or adjusted under 35 U.S.C. 154(b) by 206 days.

(21) Appl. No.: 15/161,445

(22) Filed: May 23, 2016

Related U.S. Application Data

(60) Provisional application No. 62/253,308, filed on Nov. 10, 2015.

(51) Int. Cl.
| | |
|---|---|
| *H04L 12/803* | (2013.01) |
| *H04L 12/26* | (2006.01) |
| *H04L 5/00* | (2006.01) |
| *H04L 12/741* | (2013.01) |
| *H04L 12/823* | (2013.01) |

(52) U.S. Cl.
CPC .......... *H04L 47/125* (2013.01); *H04L 5/0055* (2013.01); *H04L 43/16* (2013.01); *H04L 45/74* (2013.01); *H04L 47/32* (2013.01); *H04L 47/122* (2013.01)

(58) Field of Classification Search
CPC ......... H04L 47/12; H04L 47/11; H04L 47/14; H04L 47/18; H04L 47/27; H04L 47/32; H04L 47/41; H04L 47/122; H04L 47/125
See application file for complete search history.

(56) References Cited

PUBLICATIONS

Jiang et al., Network Congestion Avoidance Through Speculative Reservation, Feb. 25-29, 2012.*

* cited by examiner

*Primary Examiner* — Jae Y Lee
*Assistant Examiner* — Aixa Guadalupe-Cruz
(74) *Attorney, Agent, or Firm* — Karen L. Blouin; Michael J. Dobbs; Brian J. Lally

(57) ABSTRACT

A congestion management protocol that can be used for small messages in which the last-hop switch determines the congestion of the end point. The last-hop switch drops messages when the end point is congested and schedules a retransmission. A second congestion management protocol transmits small messages in a speculative mode to avoid the overhead caused by reservation handshakes.

19 Claims, 4 Drawing Sheets

NETWORK ENDPOINT CONGESTION MANAGEMENT

CROSS-REFERENCE TO RELATED APPLICATIONS

This application claims the benefit of U.S. Provisional Patent Application No. 62/253,308 filed Nov. 11, 2015 and hereby fully incorporated by reference.

GOVERNMENT INTERESTS

The United States Government has rights in this invention pursuant to Contract No. DE-AC02-05CH1231 between the U.S. Department of Energy (DOE) and Contractor.

FIELD OF THE INVENTION

The present invention relates to endpoint congestion-control protocols for networks.

BACKGROUND OF THE INVENTION

Network congestion can inhibit the performance of large-scale high-performance computing (HPC) systems and other network systems. Due to the lossless nature of HPC networks, a single point of congestion can spread through the network. When this happens it is called tree saturation. Tree saturation occurs when a full buffer at the input of a switch causes the upstream switch to halt transmission. Packets, the units of data that are routed between a source and a destination, accumulate in the upstream switch which then reaches capacity and causes additional switches to halt transmission. Eventually a tree of congested packets fans out from the original point of congestion to the rest of the network. In a shared system, the congestion caused by one application can impact other applications on the system leading to wide performance variability.

Mechanisms and protocols have been developed to address network congestion. Some adaptive routing algorithms address fabric congestion rather than endpoint congestion. Few HPC networks have hardware mechanisms for dealing with endpoint congestion which requires admission control at the traffic sources. Without mechanisms to manage endpoint congestion, HPC systems rely on software level tuning to reduce the impact of congestion.

One hardware approach to resolve endpoint congestion is the use of congestion notification such as Explicit Congestion Notification protocol (ECN). ECN can signal network congestion and reduce traffic injection rate and has been shown to work well for long-duration network congestion scenarios. However, ECN is a reactive protocol and responds to congestion after it has already occurred. It takes time for ECN to detect and throttle the congestion-causing traffic, leading to slow response times. In addition, ECN is highly sensitive to throttling parameters and a single set of parameters cannot adequately handle all congestion scenarios.

The Speculative Reservation Protocol (SRP) disclosed in U.S. Pat. No. 9,025,456, and hereby fully incorporated by reference, addresses endpoint congestion for large-scale lossless networks. SRP operates on the principle of congestion avoidance, actively combating the formation of endpoint congestion. It uses a lightweight reservation handshake between the traffic source and destination to ensure than no network endpoint is overloaded. To reduce the latency increase associated with the reservation handshake, SRP allows the traffic source to send lossy speculative packets to mask the reservation latency overhead. These speculative packets can be dropped by the otherwise lossless network if they begin to create congestion. SRP has been shown to work well for medium and large message transfers where the size of the payload is large enough to amortize the cost of reservation control measures. However, HPC networks are not always dominated by large message transfers. Network endpoint congestion can be caused by small message traffic or fine-grained communication, which is difficult to address.

A need therefore persists for a protocol which can proactively resolve endpoint congestion caused by small messages where the protocol has fast reaction times and low overhead.

SUMMARY OF THE INVENTION

According to one aspect of the invention, a method of managing congestion in a network is provided. A message packet is transmitted from a source to a destination through a last-hop switch. The message packet is a speculative packet and has a size that is smaller than or equal to the single packet size determined by the network. The message is received at a last-hop switch. The last-hop switch determines a congestion level of the destination and if the congestion level is high or exceeds a predetermined threshold, the message is dropped. If the message is dropped, the last-hop switch generates a negative acknowledgement (NACK) and a reservation which are transmitted to the source simultaneously. The NACK and reservation are sent as a non-speculative packet. The source schedules transmission of the message packet and then transmits the message packet at the predetermined time. The message packet is sent as a non-speculative packet at the predetermined time.

In another aspect of the invention, a second method of managing congestion in a network is provided. A message packet is transmitted from a source to a destination. The message packet is a speculative packet and has a size that is smaller than or equal to the single packet size determined by the network. The message is received at one of a plurality of network switches. The network switch determines a congestion level and if the congestion level is high, the message is dropped. If the message is dropped, the network switch generates a NACK which is transmitted to the source. In response, the source transmits a reservation to the destination. The destination transmits a grant to the source and the source schedules the transmittal of the message packet. At a predetermined time the message packet is transmitted to the destination as a non-speculative packet. The reservation, negative acknowledgement and grant are speculative non-packets.

BRIEF DESCRIPTION OF THE DRAWINGS

These and further aspects of the invention and their advantages can be discerned in the following detailed description, in which.

DETAILED DESCRIPTION OF THE INVENTION

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

Endpoint congestion occurs when network endpoints are oversubscribed. A network is a collection of interconnecting links and switches that transport messages and/or packets between endpoints. An endpoint is a device or node that is capable of generating and accepting messages and/or packets. In the case of endpoint congestion there are no alternate paths for traffic to route through. Unless the over-subscription of all endpoints can be predicted, over-provisioning ejection bandwidth to prevent inadmissible traffic is unrealistic for a large-scale network. As a result, endpoint congestion requires admission control whereby the injection rate of traffic sources is reduced to meet the available bandwidth at the destination endpoint.

Protocols according to the invention can be used to prevent and/or limit network congestion in lossless High Performance Computing (HPC) networks as well as any other network or application in which the protocol could be beneficial. Congestion in lossless HPC networks can result in tree saturation and a substantial degradation of system performance. Protocols according to the invention proactively resolve endpoint congestion in networks dominated by fine-grained or small messages. Protocols according to the invention have fast response times and low overhead.

Last-Hob Reserve Protocol

Figure 1:
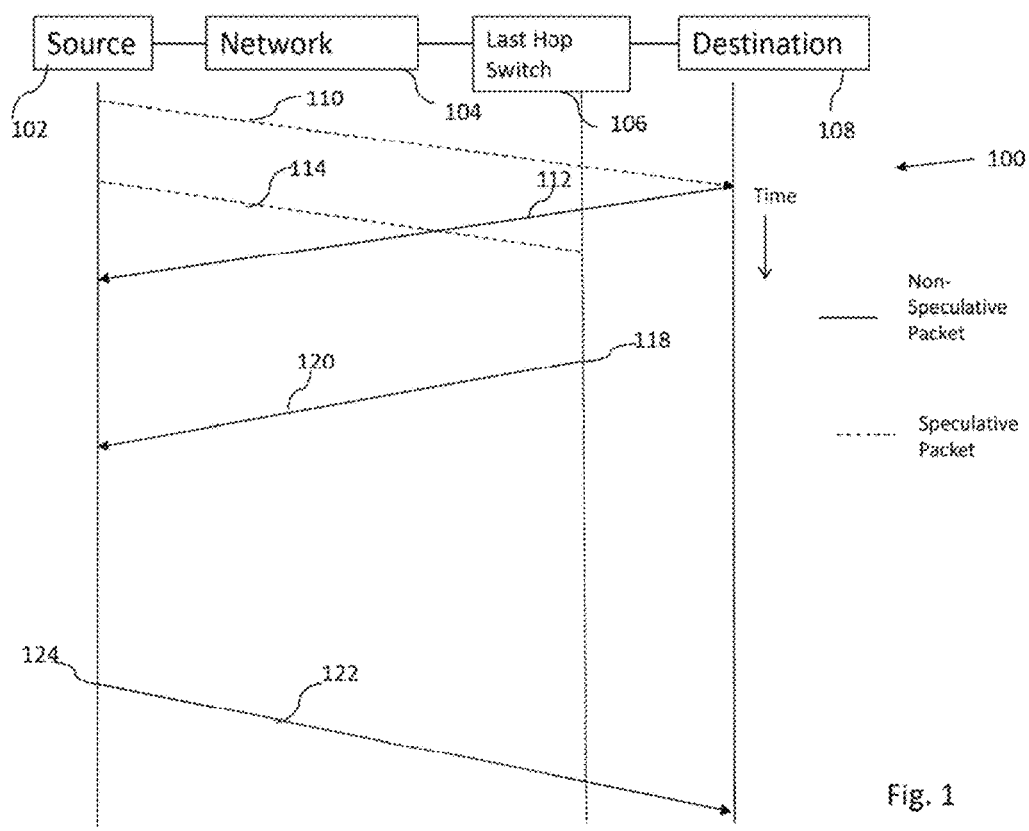
FIG. 1 is a schematic flow diagram illustrating steps in a congestion management method according to the invention.

An embodiment of the Last-Hop Reservation Protocol (LHRP) 100 is shown FIG. 1. LHRP avoids contributing to the endpoint over-subscription by moving the reservation scheduler from the endpoint to the last-hop switch 106 which is the switch just upstream of the endpoint. In other embodiments the functions performed by the last-hop switch 106 may be performed by more than one physical switch yet would still be referred to by the term last-hop switch. This would include any switches that are between the switches performing the functions of the last-hop switch 106 and the destination, or pass-through switches. By allowing the last-hop switch 106 to service reservation requests for endpoints or destinations 108 connected to the last-hop switch 106, control overhead from the ejection channels is eliminated. Network switches including but not limited to the Cray Aries switch, Mellanox Infiniband switch or Intel Omnipath switch, may be implemented as a last-hop switch 106.

In the embodiment shown in FIG. 1, messages or message packets 110, 114 are being transmitted from a source 102 to a destination 108 via a network 104 which includes a last-hop switch 106. While FIG. 1 illustrates one source 102, one destination 108 and one last-hop switch 106, it is understood that in any given network 104 there are many sources 102, many destinations 108, and many last-hop switches 106. One source 102 may transmit message packets 110,114 to many switches, including last-hop switches 106 which in turn transmit message packets 110, 114 to many destinations 108. And vice versa, a destination 108 may receive message packets 110, 114 from many last-hop switches 106 which in turn may receive message packets 110, 114 from many sources 102 and other switches. The number of sources 102, destinations 108, and last-hop switches 106 is dependent on the specific network 104 and this embodiment is not bounded by any specific hardware configuration and may be applied to all HPC networks. As used here a source is an endpoint device generating messages and/or packets. A destination is an endpoint device accepting messages and/or packets.

In the embodiment illustrated in FIG. 1, message packets 110, 114 have a size which may be measured in bits, bytes or any other standard measurement used by the network 104. Message packets 110, 114 contain data in the illustrated embodiment but may contain other information. The size of message packets 110, 114 is chosen such that the message packet 110, 114 fits into a predetermined network packet size. The size of the predetermined network packet is also measured in bits or bytes or other standard measurement and is defined by the network 104 and/or network user. In operation, large messages may be broken down into multiple message packets, all of which are equal to or smaller than the size of a single network packet. These message packets can then be transmitted using LHRP.

Message packets 110, 114 are speculative packets. Speculative packets are transmitted using a low priority Virtual Channel (VC). In the embodiment shown in FIG. 1, the transmission of message packet 110 was successful, in other words message packet 110 was received at the destination 108 because the endpoint, destination 108, was not oversubscribed. In this way LHRP avoids contributing the endpoint over-subscription because there is no reservation handshake message to compete with the message packet for ejection channel bandwidth. Because message packet 110 successfully reached destination 108, no reservation was required and LHRP did not generate additional overhead. After the successful transmission, a positive acknowledgement data packet (ACK) 112 is transmitted by the destination 108 to the source 102 as a non-speculative packet. Non-speculative packets are transmitted on higher priority Virtual Channels.

In the illustrated embodiment, message packet 114 is also sent in speculative mode from the source 102 to the destination 108 via the network 104. In this instance, the endpoint or destination 108 is oversubscribed. The congestion will first occur at the last-hop switch 106 and message packet 114 is queued at the last-hop switch 106. The last-hop switch 106 tracks the number of packets queued for each destination or endpoint 108 attached to the switch and determines a congestion level for the respective destination 108. The last-hop switch 106 may also track size of queued message packets 114 as well as other characteristics that may be determined by the network 104 and/or user.

There are several ways in which the last-hop switch 106 may determine a congestion level. In one embodiment, the last-hop switch 106 may count the number of message packets 114 in a queue for a particular endpoint or destination 108. When the total number of message packets in the queue meets or exceeds a predetermined threshold or predetermined congestion metric, the message packet 114 may be dropped. In an alternate embodiment, the message packet 114 may be placed in a queue for a particular endpoint or destination 108 at which point a timer is started. If the message packet 114 remains in the queue after a predetermined amount of time has elapsed or when the time exceeds a predetermined congestion metric, the message packet 114 will be dropped. Other embodiments may have other queuing measurements to which the last-hop switch 106 compares a predetermined congestion metric for a particular endpoint or destination 108. The queuing threshold can be adjusted such that the last-hop switch 106 dynamically maintains a speculative drop rate that prevents congested speculative messages backing up into adjacent switches creating tree saturation in the rest of the network. The congestion metric, in this embodiment the queuing threshold at the last-hop switch 106, controls the speculative drop rate of the LHRP. An increase in the queuing threshold causes an increase in the network saturation throughput. As the queuing threshold increases, the LHRP network gets closer to the saturation throughput of the baseline network with fewer speculative packet drops at high load. Accordingly, a higher queuing threshold worsens the LHRP congestion control performance.

In the illustrated embodiment, message packet 114 is dropped due to the determination by the last-hop switch 106 that the destination 108 congestion level that exceeds the predetermined congestion metric. At the last-hop switch 106 a negative acknowledgement (NACK) and a reservation 120 are transmitted simultaneously to the source 102. Simultaneously means that the NACK and reservation 120 are transmitted in the same packet but will also incorporate embodiments in which the NACK and reservation 120 are transmitted separately and within an acceptable time range such that the network performs as desired. The NACK and the reservation 120 are transmitted as a non-speculative packet.

After the NACK and reservation 120 are received by the source 102, the source 102, using the reservation, schedules a transmission of the message packet 122 as a non-speculative packet at a predetermined time 124. In the illustrated embodiment message packet 122 contains the same data as message packet 114 however, in alternate embodiments, the data in message packet 122 may be slightly different than the data in message packet 114. Non-speculative message packet 122 is transmitted on a high priority VC and is guaranteed to be lossless.

There are several ways in which the source 102 may schedule the transmission of the non-speculative message packet 122 at the predetermined time 124. The source 102 receives a reservation 120 from the last-hop switch 106. In one embodiment the reservation 120 contains a relative time at which point the non-speculative message packet 122 should be retransmitted. For example, the reservation 120 may direct the source 102 to retransmit the non-speculative message packet 122 ten seconds after the speculative packet 114 was dropped 118. The source 102, in this embodiment, may take several steps to determine the time at which the non-speculative message packet 122 should be scheduled for transmission. The steps listed are not limiting, and any steps, processes or procedures may be utilized if it produces acceptable results.

one embodiment, the source 102 compares the time stamp for the transmission of the speculative packet 114 to the time stamp for the receipt of the NACK and reservation 120. The source 102 can then determine the time that the speculative packet 114 was dropped 118 by dividing in half the time in between the transmission of the speculative packet 114 and the receipt of the NACK and reservation 120. Once the time that the speculative packet 114 was dropped 118 is determined, the source 102 can calculate the predetermined time for retransmission. To calculate the predetermined time for retransmission 124, the source adds ten seconds to the time the speculative packet was dropped 118, and resends the message packet as a non-speculative packet 122 at the predetermined time 124.

In an alternate embodiment, the source 102 may determine the predetermined time for retransmission 124 by adding the reservation time 120 to the time stamp at which the speculative packet 114 was transmitted. In other embodiments the source 102 may schedule the transmittal of the message packet 122 as a non-speculative packet in a different way. Any scheduling methodology may be used as long as it results in the message packet 122 transmitted at the predetermined time 124.

At the predetermined transmission time 124, the source 102 transmits the message packet 122 as a non-speculative packet to the destination 108. Moving the reservation scheduler to the last-hop switch 106 means the LHRP avoids contributing to end point congestion. Control overhead from the ejection channels is eliminated and congestion will not back up into adjacent switches and create tree saturation. In this embodiment message packet 122 is identical to message packet 114.

In some embodiments the LHRP may be used to send large messages or messages larger than the size of a single network packet or predetermined network packet. In those embodiments, the messages are segmented into multiple packets before injection. After traversing the network via the LHRP, the message is reassembled at the destination.

Small Message Speculative Reservation Protocol

Figure 2:
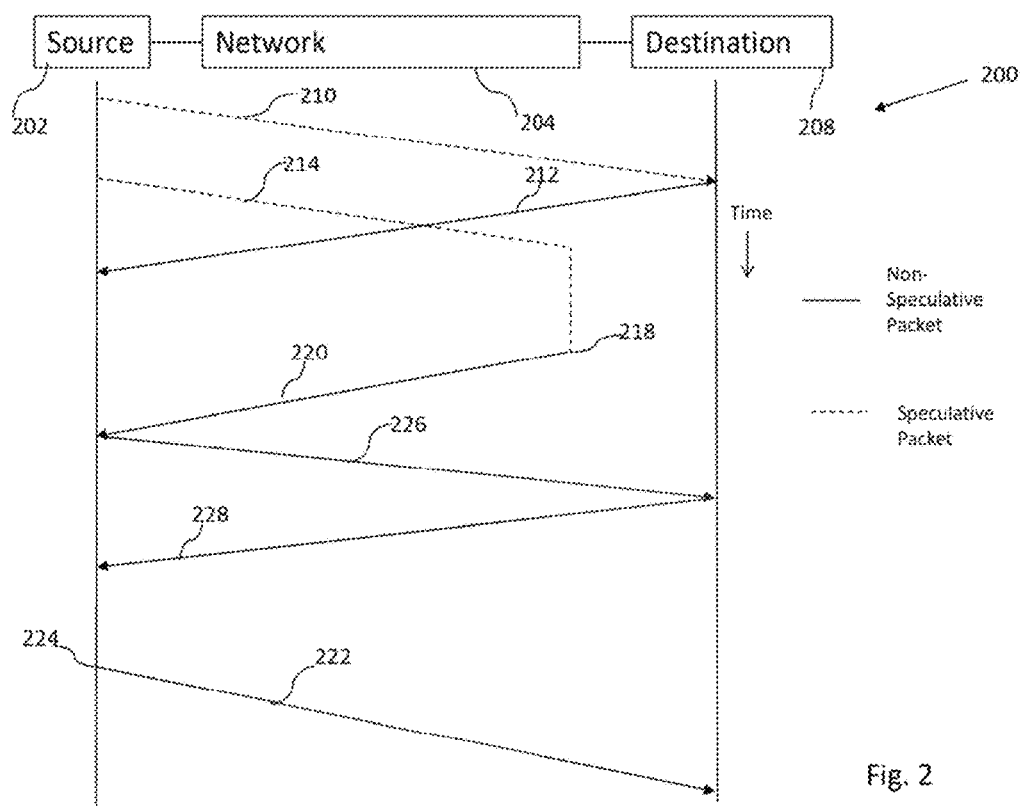
FIG. 2 is a schematic flow diagram illustrating steps in a second congestion management method according to the invention.

An embodiment of the Small-Message Speculative Reservation Protocol (SMSRP) 200 is shown in FIG. 2. SMSRP is similar to the Speculative Reservation Protocol (SRP) although a reservation is only issued after congestion has been detected. In the embodiment shown in FIG. 2, messages or message packets 210, 214 are transmitted from a source 202 to a destination 208 via the network 204. While FIG. 2 illustrates one source 202 and one destination 208, it is understood that in any given network there are many sources 202 and many destinations 208. One source 202 may transmit packets to many destinations 208. And vice versa, a destination 208 receives packets from many sources 202. The number of sources 202 and destinations 208 is dependent on the specific network 204 and this embodiment is not bounded by any specific hardware configuration and may be applied to all HPC networks.

In the embodiment illustrated in FIG. 2, message packets 210, 214 have a size which may be measured in bits, bytes or other standard measurement used by the network. The size of message packets 210, 214 is chosen such that the message packet is equal or smaller than the size of a single network packet. The size of the single network packet is measured in bits or bytes or other standard measurement and is defined by the network and/or network user.

Message packets 210, 214 are speculative packets. As discussed above, speculative packets are transmitted using a low priority VC. In the embodiment shown in FIG. 2, the transmission of message packet 210 was successful, in other words message packet 210 was received at the destination 208 because the endpoint, destination 208, was not oversubscribed. When the endpoint or destination 208 is congestion-free, SMSRP generates almost no overhead in the system. A positive acknowledgement (ACK) 212 is transmitted from the destination 208 to the source 202 as a non-speculative packet.

Message packet 214 is also sent as a speculative packet from the source 202 to the destination 208 via the network 204. In this instance, the endpoint or destination 208 is oversubscribed. Message packet 214 is queued at a network switch. There are several ways in which the network switch may determine a congestion level of the endpoint or destination 208. Similar to the last-hop switch 106 as discussed above, the network switch may determine congestion by counting the number of packets in a queue for a particular endpoint or destination 208. When the number of packets meets or exceeds a predetermined threshold, the packet may be dropped. In an alternate embodiment, the message packet 214 may be placed in a queue for a particular endpoint or destination 208 and at which point a timer may be started. If the message packet 214 remains in the queue after a predetermined amount of time has elapsed, the message packet 214 will be dropped. Other embodiments may have other queuing thresholds to which the last hop switch compares its queue for a particular endpoint or destination 208.

If the message packet 214 is dropped 218, a NACK 220 is transmitted to the destination 208. The NACK 220 is a non-speculative packet. Upon receipt of the NACK 220, the source 202 transmits a reservation 226 to the destination 208. The reservation 226 is a non-speculative packet. In response, the destination 208 transmits a grant 228 as a non-speculative packet. The grant 228 includes a transmission time, 224. At the transmission time 224, the source 202 transmits the message packet 222 as a non-speculative packet to the destination 208. In this embodiment message packet 222 is identical to message packet 214.

Testing Results

Experimental embodiments and results provide insight into the performance of networks running the SMSRP and LHRP protocols 100, 200. The experimental embodiments do not limit or characterize all embodiments of the present disclosure. The experiments were conducted on a 1056 node dragonfly network with a full bisection bandwidth and used a modified version of the cycle-accurate network simulator Booksim. The experimental network was constructed from 15-port switches with 4 endpoints, 7 local channels and 4 global channels per switch. Each dragonfly group consists of 8 switches and the network has 33 groups. The latency of local channels within a dragonfly group was set to 50 nanoseconds. The latency of global channels between groups was set to 1 microsecond. The bandwidth capacity of a channel was 100 Gigabits per second. For routing, the latest adaptive routing algorithm for the dragonfly was implemented in order to prevent fabric congestion. Each traffic class had a sufficient number of VCs to avoid routing deadlock.

In the experimental testing embodiment network switches were implemented using combined input/output-queued (CIOQ) architecture and used credit-based virtual cut-throughput flow control. At the switch input, each VC buffer was split into multiple virtual output queues (VOQ). The switch output queues were chosen to have buffering for 16 maximum sized packets per VC. The switch output queues have buffering for 16 maximum sized packets per VC. The switch crossbar has a 2× speedup over the network channels. The VOQs and speedup allows the switch to achieve nearly 100% throughput.

The network switches were assumed to be operating at 1 GHz. Switch operations were simulated at the granularity of 100 bit flits (100 Gb/s @1 G-Hz). The minimum packet size was a single flit, used for control packets (reservation, grant, ACK, NACK). The maximum packet size was 24 flits. Messages bigger than the maximum packet size were segmented by the source network interface before injecting into the network. All data packets were acknowledged by the destination.

The number of traffic classes in the network depends on the congestion control protocol. The baseline network with no congestion control uses one traffic class for data messages, and one high priority traffic class for ACKs. The LIMP protocol uses an additional low priority traffic class for speculative messages. NACKs share the same traffic class as ACKs. SMSRP uses two additional high priority traffic classes for reservation and grant. This is to prevent deadlock during the reservation handshake.

Traffic was generated by network endpoints in the granularity of messages. Message sizes were specified with each experiment. When transmitting messages, network endpoints used a mechanism similar to the Infiniband queue-pairs. The source endpoint created a separate send queue for each destination and the destination endpoint created a separate receive queue for each source. Multiple active send queues at a source arbitrated for the injection channel on a per packet, round-robin basis.

The network protocols were tested using two synthetic traffic patterns and all simulations were run for at least 500 microseconds to ensure the networks have achieved steady state. The performance of the protocols was evaluated in two scenarios, a hot-spot performance and a congestion-free network performance.

The hot-spot performance was evaluated using a 60:4 hot-spot traffic pattern with a message size of 4 flits. Under this traffic configuration, 60 sources were randomly selected to send traffic to 4 destinations while leaving other sources and destinations in the network idle. The over-subscription factor to the destinations was varied by changing the injection rate of the sources, up to 15× over-subscription. By using a hot-spot traffic pattern with multiple destinations, the effect of any scheduling conflicts, such as when a source receives similar reservation times from multiple destinations, was captured.

Figure 3:
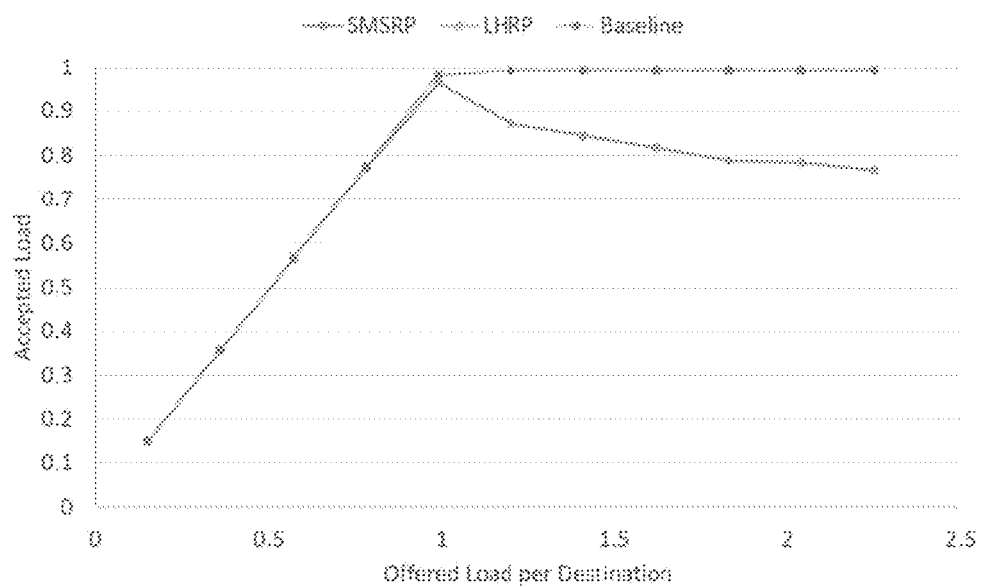
FIG. 3 is a graph illustrating the accepted data throughput for specific loads.

The network latency of different protocols as the traffic load increases is illustrated in FIG. 3. Network latency is defined as the time between source injection and destination ejection and does not include source queuing delay. It reflects the level of queuing within the network fabric, a valuable metric to measure the extent of tree saturation. When the traffic load per destination increases beyond 100%, the destinations saturate and congestion occurs. Consequently, in the baseline network with no congestion control, the latency grows significantly. This is indicative of tree saturation, where all queues between source and destination are filled and the network is in gridlock.

The LHRP and SMSRP protocols have low network latency after the point of saturation, indicating that both networks remain tree saturation free despite endpoint congestion. As the traffic load increases further, the network using SMSRP shows an upward trend in latency. This is because at a higher load, more speculative messages are dropped due to congestion. This in turn triggers sources to send reservation handshakes to the destination, further increasing its load. At the limiting case, every SMSRP speculative message could be dropped and the protocol's performance would become identical to that of SRP. However, the results show that with low levels of endpoint over-subscription, SMSRP is an effective protocol.

The network using LHRP shows nearly no change in network latency as the traffic load is increased beyond saturation. This is because when LHRP speculative messages are dropped their reservations are piggybacked along NACKs. The LHRP network does not consume additional bandwidth for a separate reservation handshake. At the limiting case, if every LHRP speculative message is dropped, there is only a moderate latency increase as the utilization of the last-hop switch becomes higher. However, the traffic load at the destination endpoint will not increase because reservations are handled by the last-hop switch.

Throughput also shows differences between the performances of the protocols. LHRP is able to sustain the accepted data throughput at nearly 100% because the ejection channel bandwidth for the hotspots is not consumed by control packets. SMSRP also reaches saturation at 100% load and as the offered load increases further, its accepted data throughput decreases. The declining data throughput is caused by the increasing number of reservation handshakes triggered by dropped speculative messages.

Congestion caused by real applications is likely to be transient, occurring only during their communication phases. A protocol's response time to the onset of congestion is also a critical factor in determining its real system performance. The protocols were tested for transient response using a combination of uniform random and hot-spot traffic patterns. At the start of the simulation a uniform random traffic pattern was launched at 40% load among 992 nodes of the 1056-node network to serve as the victim traffic. After 20 microseconds in simulated time, a 60:4 hot-spot traffic was launched on the remaining 64 nodes. The injection rate of each hot-spot source was at 50% resulting in a 7.5× over-subscription of each hot-spot destination. Both traffic patterns use 4-flit messages.

The simulations showed that the victim traffic became severely affected by the hot-spot traffic in the baseline network with no congestion control. When tree saturation was formed around the hot-spot, other traffic flows that share paths with the saturated traffic also experienced significant queuing delays. With adaptive routing, a network can delay the saturation impact for some time by routing traffic through less congested paths in the network. However, adaptive routing will also spread the congested traffic to the adaptive paths, and eventually cause many more paths to saturate in the network.

By contrast, the victim traffic in the LHRP and SMSRP networks showed minimal impact from the hot-spot traffic. On average, the message latency increased by less than 50 nanoseconds. This indicates that tree saturation did not form and the victim traffic is free to utilize all paths in the network. The LIMP network showed slightly, lower latency than the SMSRP network.

Overhead generated by a congestion control protocol can be measured by its performance under congestion-free traffic conditions. Under congestion-free conditions, the baseline network with no overhead has the optimal performance. Both LIMP and SMSRP show significantly higher saturation throughput than SRP. This shows that both protocols generate far less overhead when the network is congestion free. SMSRP shows a slightly lower saturation throughput compared to the baseline due to overhead generated when speculative messages are dropped in a highly contended network. LHRP's performance is nearly identical to the baseline, an indication that the protocol creates almost zero overhead at very high levels.

Figure 4:
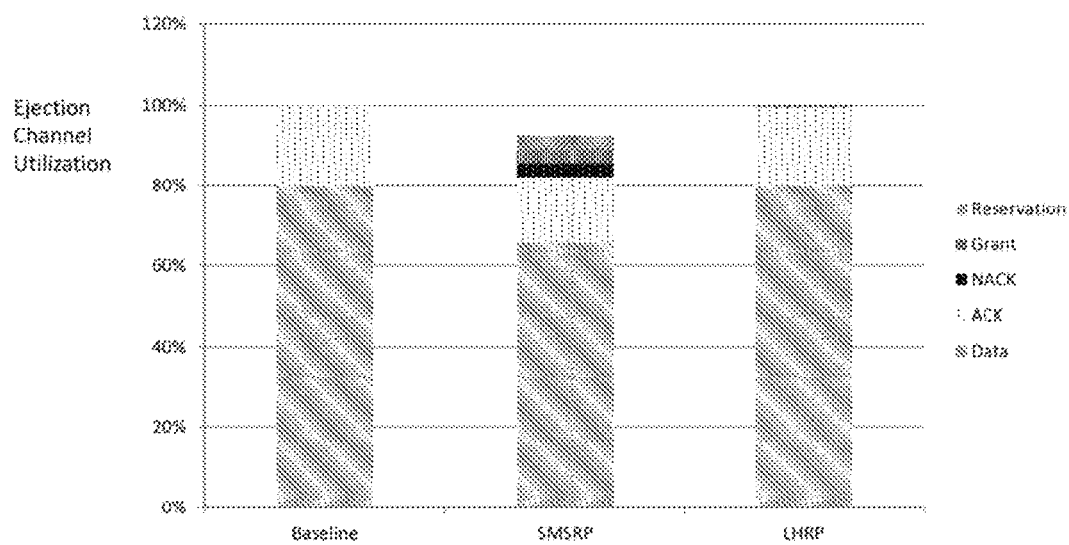
FIG. 4. is a bar chart illustrating the utilization breakdown of the protocols.

FIG. 4 illustrates an in-depth analysis of protocol overhead demonstrating the utilization breakdown of the network ejection channels for uniform random traffic at 80% load. The baseline network shows that the ejection channel has a data utilization rate of 80%. The remaining 20% of the channel is consumed by ACKs. In the SMSRP network, NACKs consume 3.5% of ejection bandwidth, showing that some speculative messages are dropped in the network. These NACKs lead to similar levels of reservation handshake messages, creating more network overhead. These control messages are prioritized over data messages for the ejection channel, leading to lower data throughput and earlier network saturation. The SMSRP overhead analysis is consistent with the hot-spot throughput result: as network load increased beyond saturation, the data throughput of the network decreased due to contention with control packets.

The LHRP utilization breakdown looks nearly identical to the baseline, dominated by data and ACK packets. The data shows that NACKs consumed only 0.2% of the ejection bandwidth, indicating a very low speculative message drop rate. Furthermore, a dropped speculative message in LHRP does not generate additional control overhead because the reservation time for the message is piggybacked on the NACK. The LHRP protocol consistently out performs the SMSRP protocol and creates less overhead.

A distinguishing feature of the LHRP protocol is that speculative messages are only allowed to drop at the last-hop switch. Since the reservation scheduler for an endpoint is located at the last-hop switch, a packet drop here can acquire a reservation time to be piggybacked with the NACK. However, if a traffic pattern has very high levels of endpoint over-subscription or is a switch has multiple over-subscribed endpoints, it is possible for congestion to occur before the last-hop switch. In general, if the aggregate oversubscription of all endpoints connected to a switch is greater than the number of fabric ports, the switch cannot drop speculative messages fast enough and congestion will form at the fabric channels leading to the switch. In a large-scale network constructed from high-radix switches with 48 to 64 ports, traffic scenarios that overload such a switch should be rare.

Alternatively the switch over-subscription problem can be resolved by allowing the LHRP protocol to drop speculative messages in the fabric before the last-hop switch. This would operate similar to SRP and SMSRP where a speculative message can be dropped anywhere in the network fabric after experiencing long queuing delays. Since LHRP does not use separate control messages to acquire reservations, speculative messages dropped outside of the last-hop switch cannot acquire reservations. When the message source receives a NACK without a reservation time, it has to retransmit the message again as a speculative packet. If the severe congestion is transient, the second speculative retransmission may succeed or it may acquire a reservation. On the other hand, the message source can detect sustained, sever congestion e destination, through repeated reservation-less NACKs. It may then coalesce the dropped messages into a single guaranteed reservation similar to the SRP protocol in order to guarantee forward progress.

While embodiments of the present invention have been described in the above detailed description and illustrated in the appended drawings, the present invention is not limited thereto but only by the scope and spirit of the appended claims.

The invention claimed is:

1. A method for congestion management in a network, the method comprising the steps of:
   (a) transmitting a message packet from a source to a destination, said message packet being a speculative packet, said message packet having a message packet size, the message packet size being smaller than or equal to a predetermined packet size for the respective network;
   (b) receiving said message packet at a last-hop switch;
   (c) determining, at said last-hop switch, a destination congestion level;
   (d) upon determining, by said last-hop switch, that the destination congestion level exceeds a predetermined threshold, dropping, at said last-hop switch, said message packet;
   (e) responsive to said step of dropping, generating, at said last-hop switch, both a negative acknowledgement and a reservation, the negative acknowledgement and the reservation transmitted simultaneously from said last-hop switch to said source, the negative acknowledgement and the reservation being a non-speculative packet;
   (f) scheduling, at said source, a transmittal of the message packet; and
   (g) transmitting, at a predetermined time, said message packet from said source to said destination, said message packet being a non-speculative packet.

2. The method of claim 1, further including the step of: repeating steps (a)-(g) a desired number of times.

3. The method of claim 1, wherein the step of determining a congestion level further includes:
   a. queuing said message packet at the last-hop switch;
   b. determining a queuing level;
   c. comparing the queuing level to a predetermined congestion metric.

4. The method of claim 3, wherein the queuing level is a number of message packets in the respective queue and the predetermined congestion metric is a maximum number of message packets.

5. The method of claim 3, wherein the queuing level is a first elapsed time measurement and the predetermined congestion metric is a second elapsed time measurement.

6. The method of claim 1, wherein said message packet is transmitted at a first time, the negative acknowledgement is received at a second time, wherein the step of scheduling further includes
   a. calculating a third time by subtracting said first time from said second time;
   b. calculating a time differential by dividing said third time by two;
   c. calculating the predetermined time by adding the reservation time to said time differential.

7. The method of claim 1, wherein said message packet is transmitted at a first time, wherein the step of scheduling further includes calculating the predetermined time by adding the reservation time to said first time.

8. The method of claim 1, wherein said message packet contains data.

9. The method of claim 1, wherein said source is one of a plurality of sources, said destination is one of a plurality of destinations, said last-hop switch is one of a plurality of last-hop switches, each of the plurality of last-hop switches connected concurrently to more than one of the plurality of sources and more than one of the plurality of destinations.

10. The method of claim 1, wherein the speculative packets use a first virtual channel and the non-speculative packets use a second virtual channel, said first virtual channel having a lower priority than said second virtual channel.

11. The method of claim 2, and further comprising the step of:
    reassembling, at said destination, a large message from a plurality of message packets.

12. A method for congestion management in a network, the method comprising the steps of:
    (a) transmitting a message packet from a source to a destination, said message packet being a speculative packet, said message packet having a message packet size, the message packet size being smaller than or equal to a predetermined packet size for the respective network;
    (b) receiving said message packet at one of a plurality of network switches;
    (c) determining, at the one of a plurality of network switches, a destination congestion level;
    (d) upon determining, at one of a plurality of network switches, that the destination congestion level exceeds a predetermined threshold, dropping, at the one of a plurality of network switches, said message packet;
    (e) generating, at the one of a plurality of network switches, a negative acknowledgement, the negative acknowledgement transmitted to the source, the negative acknowledgement being a non-speculative packet;
    (f) transmitting, from said source to said destination, a reservation, the reservation being a non-speculative packet;
    (g) transmitting, from said destination to said source, a grant, the grant being a non-speculative packet;
    (h) scheduling, at said source, a transmittal of said message packet; and
    (i) transmitting, at a predetermined time, said message packet from said source to said destination, said message packet being a non-speculative packet.

13. The method of claim 12, further including the step of: repeating steps (a)-(i) a desired number of times.

14. The method of claim 12, wherein the step of determining a congestion level further includes:
    a. queuing said message packet at the one of a plurality of network switches;
    b. determining a queuing level;
    c. comparing the queuing level to a predetermined congestion metric.

15. The method of claim 14, wherein the queuing level is a number of message packets in the respective queue and the predetermined congestion metric is a maximum number of message packets.

16. The method of claim 14, wherein the queuing level is a first elapsed time measurement and the predetermined congestion metric is a second elapsed time measurement.

17. The method of claim 12, wherein said message packet contains data.

18. The method of claim 12, wherein said source is one of a plurality of sources, said destination is one of a plurality of destinations.

19. The method of claim 12, wherein the speculative packets use a first virtual channel and the non-speculative packets use a second virtual channel, said first virtual channel having a lower priority than said second virtual channel.

\* \* \* \* \*